INVENTOR
WILLIAM R. WILLIAMSON
BY
ATTORNEY

Jan. 7, 1969  W. R. WILLIAMSON  3,420,747
MULTISTAGE MULTIEFFECT DISTILLATION SYSTEM
Filed March 17, 1965  Sheet 3 of 5

INVENTOR
WILLIAM R. WILLIAMSON
BY
ATTORNEY

INVENTOR
WILLIAM R. WILLIAMSON

Jan. 7, 1969     W. R. WILLIAMSON     3,420,747

MULTISTAGE MULTIEFFECT DISTILLATION SYSTEM

Filed March 17, 1965     Sheet 5 of 5

INVENTOR
WILLIAM R. WILLIAMSON

BY
ATTORNEY 3,420,747
MULTISTAGE MULTIEFFECT DISTILLATION SYSTEM
William R. Williamson, Waterford, Conn., assignor to American Machine & Foundry Company, a corporation of New Jersey
Filed Mar. 17, 1965, Ser. No. 440,494
Claims priority, application Great Britain, Mar. 15, 1965, 11,954/65
U.S. Cl. 202—173　　　　3 Claims
Int. Cl. B01d 3/42; C02b 1/04

This invention relates in general to distillation apparatus and, more particularly, to distillation apparatus which uses a compressed and volatilized secondary heat transfer fluid to distill sea water.

An object of this invention is to provide a water distillation apparatus of moderate capacity which is more easily installed, operated and maintained.

Another object of this invention is to provide a more efficient water distillation apparatus for a given capital investment.

A further object of this invention is to provide a more effective means for removing air, carbon dioxide and other gases from the condensing section of a distillation apparatus.

Yet another object of this invention is to provide a distillation apparatus using a commercially and thus readily available Freon system with excessive heat from the Freon system being removed by an excess of feed water.

A still further object of this invention is to provide a distillation apparatus which couples the high gained output ratio of a multistage flash evaporator with a secondary high coefficient of performance Freon loop.

The invention further relates to an improved liquid purification method and apparatus, the main objects of which are:

(1) To provide the liquid distillation process and apparatus in which multiple and inter-related liquid heating conditions are facilitated to permit the evaporation procedures characterised by a high thermal economy;

(2) To provide a multiple effect, multiple stage evaporator having an arrangement of stages in each effect wherein the thermal efficiency of the evaporator is greatly improved by extensive recovery of heat from effluent liquid re-cycled between the effect; and (3) To provide a scale inhibiting, multiple effect of process and apparatus for improving the operation of a salt water distillation structure in which a relatively low concentration of impurities is maintained in the effluent salt water thereof present at high temperatures, and relatively higher concentration of impurities in the effluent salt water thereof present at lower temperatures. Reference is made to U.S. patent application 440,439 filed Mar. 17, 1965.

Many other objects, advantages and features of invention will be more clearly understood from the following constructional embodiments of the invention described, by way of example, with reference to the accompanying drawings, wherein.

Figure 1:
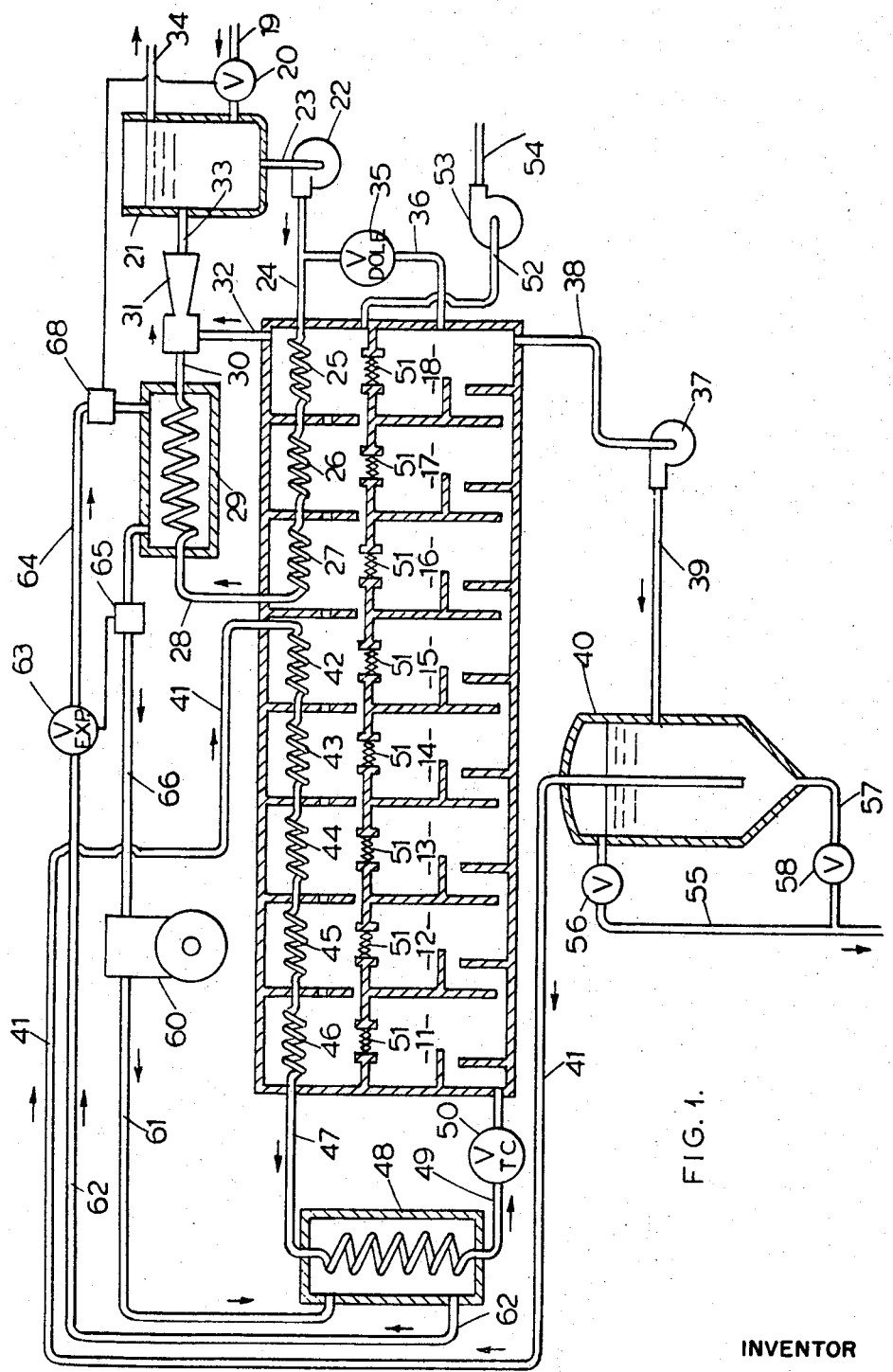
FIGURES 1, 2 and 3 are schematic diagrams with some elements shown in section of three embodiments of the invention.

Referring to the drawings in detail, FIGURE 1 shows a first embodiment of this invention. Eight evaporator and condenser stages 11–18 may be connected together as an integral unit. Cooling and feedwater enters through pipe 19 and valve 20 to flow into the open top tank 21. The open tank 21 may contain Rashig rings to prevent excessive foaming. Pump 22 draws water through pipe 23 from tank 21 and discharges it through pipe 24 to pass through the condensing coils 25–27 in the stages 18, 17 and 16. From stage 16 pipe 28 leads to the Freon evaporator 29. The Freon evaporator 29 cools water passing through it which then passes through pipe 30 through the eductor 31.

Eductor 31 draws carbon dioxide, air and any other gases present from the condensing section of stage 18 through pipe 32. Eductor 31 discharges the mixture of water and included gases through pipe 33 back into tank 21. Excessive fluid bows from tank 21 through the overflow pipe 34.

Referring further to FIGURE 1, a dole valve 35 in pipe 36 draws off a constant quantity of water regardless of pressure through pipe 36 to introduce it into the evaporating section of stage 18. Pump 37 draws unevaporated fluid from stage 18 as well as fluid introduced through pipe 36 through pipe 38. Pump 37 discharges this fluid through pipe 39 into the closed surge tank 40. From the closed surge tank 40 water is vacuum drawn through pipe 41 to pass through the condensing coils 42–46 in the stages 15, 14, 13, 12 and 11. From stage 11 pipe 47 conducts fluid to the Freon condenser 48 in which it is heated to pass from it through pipe 49 and the temperature control valve 50 into the evaporating section of stage 11. Water passes from stages 11 to 18 successively flashing into steam at a lower temperature in each stage. Steam passes through the wire mesh drop separators 51 to condense on the condensing coils 42–46 and 25–27. Condensate dripping from these condensing coils flows to the right as shown in FIGURE 1 to be drawn off through pipe 52 by the distillate pump 53 to be passed on to storage through pipe 54.

Leading from tank 40 is a pipe 55 containing a check valve 56 which drains fluid from tank 40. The pipe 57 containing a valve 58 leads from the bottom of tank 40. At intervals up to a week or more, valve 58 may be opened to remove any precipitates or sediments from tank 40. Pipe 55 maintains a constant level of fluid within tank 40. Tank 40 is closed and functions as a surge tank to prevent wandering or seeking of the automatic controls which will be described.

The Freon loop is conventional. A compressor 60 pumps Freon through pipe 61 to the Freon condenser 48. From the Freon condenser 48 pipe 62 leads through the expansion valve 63 to pipe 64 which leads to the Freon evaporator 29. The expansion valve 63 may be regulated by a suitable control means 65 in pipe 66 conducting Freon from the Freon evaporator 29 to compressor 60.

A suction pressure control 68 in pipe 64 regulates the amount of cooling and feed water introduced through valve 20 and pipe 19 into tank 21.

This first embodiment of this invention may operate in the following manner. Water enters pipe 19 at an ambient temperature of about 75° F. This water mixes with warmer water at about 90° F. being discharged through pipe 33 into tank 21 so that water is drawn by pump 22 from tank 21 at a temperature of about 85° F. Coils 25, 26 and 27 raise the temperature of water passing through them to 90°, 95° and then 100° F. Water at 100° F. passes through pipe 28 and the Freon evaporator 29 to be recirculated through eductor 31 into tank 21. Since more cooling water is introduced into tank 21 through pipes 19 and 33 than is withdrawn through pipe 23, some cooling water is discharged as waste through pipe 34. The heat carried out with water through pipe 34 serves to remove waste heat introduced into the Freon loop by the compressor 60. Thus the suction pressure control 68 regulates valve 20 to admit cooling water as required.

Dole valve 35 introduces cooling for feed water into stage 18 from which it is immediately withdrawn by pump 37 along with undistilled brine to be passed into tank 40. The fluid drawn from stage 18 is at a temperature of about 100° F. This water at 100° F. is vacuum drawn through the coils 42–46 to leave them at temperatures of 105° F., 110° F., 115° F., 120° F., 125° F. and 130° F. respectively. In the Freon condenser 48 the water is heated to a temperature of 140° F. and introduced through a temperature control valve 50 into stage 11. When the system is in operation, temperature control valve 50 ensures that water flowing into stage 11 through pipe 49 is at a temperature of at least 140° F. This water partially flashes into vapor and passes to stage 12 at a temperature of 135° F. From stages 12–18, the water successively partially flashes to vapor and passes to the next stage at temperatures of 130° F., 125° F., 120° F., 115° F., 110° F. and 100° F. The forementioned temperatures are purely illustrative and should not be interpreted as limiting the invention in any way.

The first embodiment of this invention enjoys many advantages. First, any carbon dioxide drawn out through pipe 32 is mixed with the incoming raw water and cannot contaminate the distillate. Much of this carbon dioxide escapes into the air as the Rashig Rings in tank 21 break up foam and ensure that only liquid is drawn to pump 22. Carbon dioxide in solution passes with waste through pipe 34.

The eductor pump 22 forces inlet water from tank 21 through the condensing coils of more than one stage to achieve a heat balance between a plurality of stages.

Figure 4:
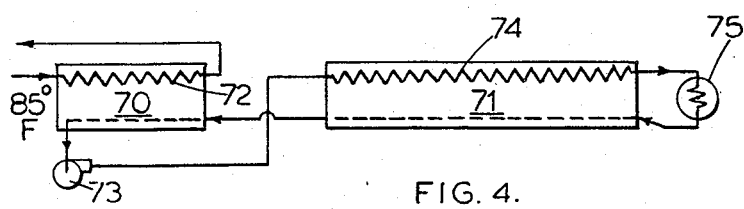
FIGURES 4, 5 and 6 are schematic diagrams of multistage, multieffect, and multistage-multieffect distillation apparatus, respectively.

FIGURE 4 is a simple diagram of a multistage evaporator. Two sets of stages 70 and 71 are similar to those shown in FIGURE 1. Cooling water at an ambient temperature of 85° F. is shown entering the condensing coils 72 of the first set of stages 70. Brine is pumped by pump 73 through the condensing coils 74 of the second set of stages 71. While passing through the condensing coils 74, the brine is heated. After leaving the condensing coils 74, the heated brine is further heated in a suitable heat exchanger 75 or other device and then passed back through the second set of stages 71 to flash into steam. The brine passes from the stages 71 to the stages 70 to continue to flash into steam. The brine may then be recirculated by pump 73. This type of multistage flash evaporator has been accepted as being about the most reliable and economical arrangement possible for use with acidified sea waters.

Figure 5:
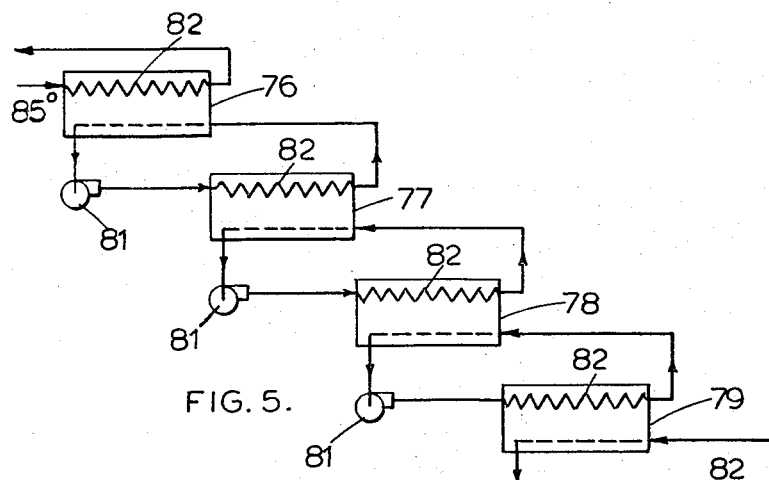

FIGURE 5 is a diagram of a flash evaporator arranged in multiple effect. Each effect consists of a group of stages 76–80. With forward feed, the high temperature end disposed at the stage 80, can be run at lower densities than the simple multiple effect arrangement shown in FIGURE 4. This permits a higher temperature without scaling. Further, the total amount of sea water treated by a multiple effect arrangement as shown in FIGURE 5 may be as little as half that required for a given production of distillate for the arrangement of multiple stages because a forward feed conducting brine from the stages 80 toward the stages 76 permits concentrations as high as three at the cold end represented by the stages 76. As shown, the pumps 81 pass brine from each succeeding set of stages through the condensing coils 82 of a prior stage. A heat source 83 is required after the last group of stages 80. With the arrangement shown in FIGURE 5, the overall gain is about 40 percent in output over that shown in FIGURE 4 with the same heat transfer surfaces.

Figure 6:
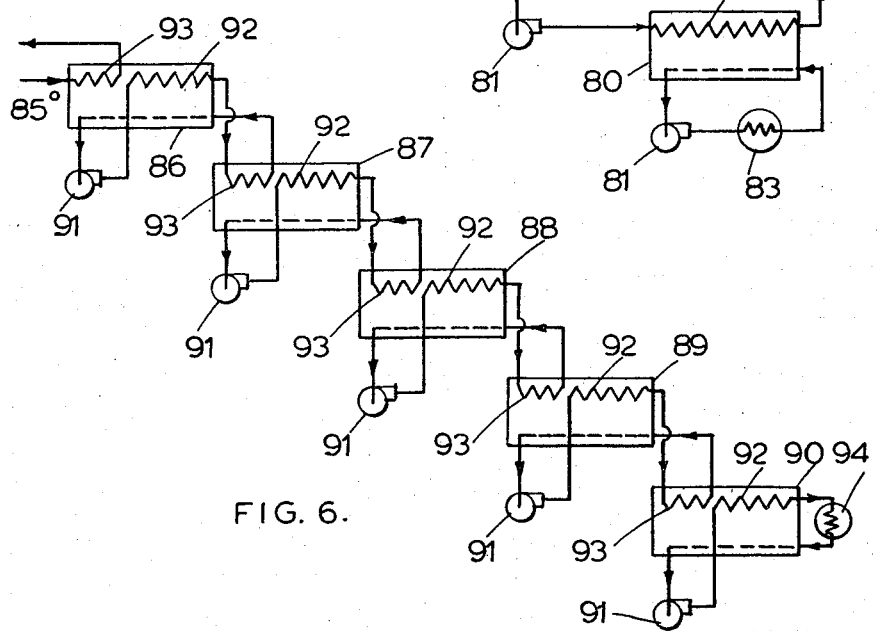

FIGURE 6 shows an entirely new cycle. It consists of a number of recirculating flash stages 86–90 each having individual gained output ratios greater than one, the groups of stages 86–90 being combined in a multieffect relationship which reduces the number of pumps and the number of effects required. The pumps 91 from each of the low temperature and intermediate effects pass brine emerging from the low temperature end of each effect through some of the distilling coils 92 in this effect and they then pass the brine through the endmost distilling coils 93 in a succeeding effect. The last effect 90 requires an external heat source 94.

This arrangement with heat recovery sections in each of the effects and with a heat source incorporated in the tail end of the high temperature effect permits greater overall gained output ratios than in any previously devised arrangement. It further reduces the number of pumps and the number of effects required for a given capacity. Further, it permits more stages to be incorporated because this arrangement can take advantage of the high delta $p$ available at higher temperatures by progressively increasing the circulation rate at higher temperatures and lowering the delta $t$ between stages. The interstage orifices (not shown) can actually remain the same in all effects permitting delta $p$'s between any two stages to be substantially the same. The circulation rates can be progressively increased to allow the lower temperature gradients possible with the same delta $p$'s between the higher stages.

The arrangement shown in FIGURE 6 permits an overall gain of about 75 percent for the same heat transfer surfaces as compared to the simple multistage arrangement of FIGURE 4. The particular apparatus shown in FIGURE 1 lends itself to having a number of such units placed in a multistage-multieffect arrangement according to FIGURE 6.

Figure 7:
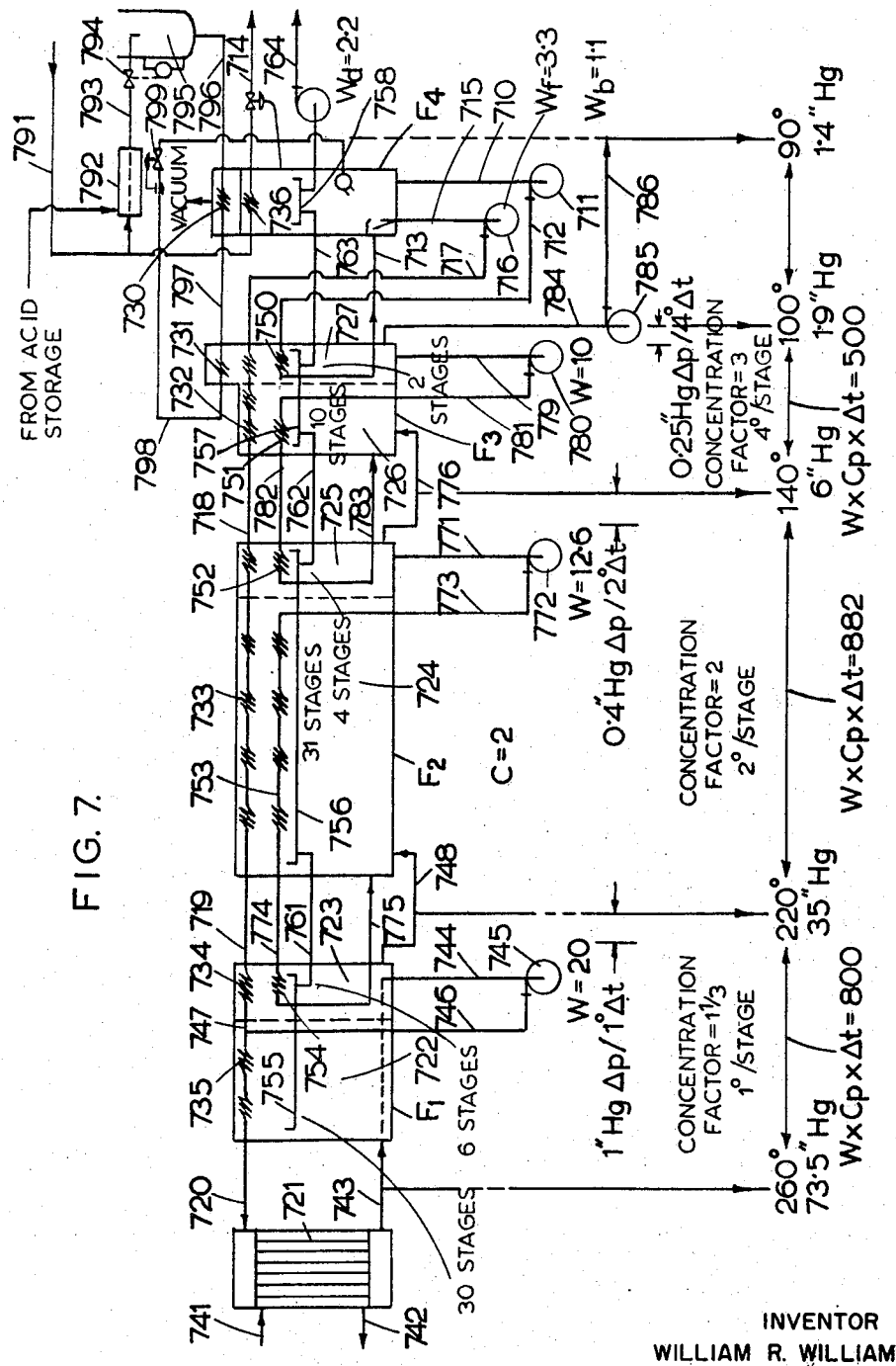
FIGURE 7 shows schematically the multiple effect, multistage flash evaporator.

A sea water flash evaporator as shown in FIGURE 7 consists primarily of three, more or less, multiple-stage effects F1, F2 and F3 respectively. These effects are shown interconnected with each other, and as having joined thereto a primary heat source 721, and a deaerating flash effect F4, by means of a multiplicity of lines depicting conduits through which flow the various fluid materials processed in the system. The manifold stages making up each effect are serially connected in a well known manner to facilitate the flow of feed brine from a source, such as the sea, through individual feed water heat exchangers provided in the upper portions of each stage, to move counter-current to the flow of heated effluent brine leaving the primary heater and moving successively through the individual flash chambers of the stages. Essentially, the procedure involved is one of flash evaporation and condensation wherein the heated brine flows from the first stage of effect F1 whereat the effective temperature and pressure of the system are highest, to the last stage of effect F3, whereat the effective system temperature and pressure are lowest. The condensates formed, constituting the product water, are carried away in conduits connected to product water collector device suitably positioned under condensing structures in the stages.

The multiple stages of each effect are grouped into two distinct operative sections. As indicated in FIGURE 7 effect F1 is made up of an initial section 722 of many stages, and a further section 723 of a much lesser number of stages. The multiplicity of stages in effects F2 and F3 are similarly grouped into dual sections 724, 725 and 726, 727 respectively. The number of stages designated in each of the sections, as shown by the figure, is by way of example only, it being obvious that the actual number of stages to be employed in either part of effects F1, F2 or F3, is determinable by pressure gradients available in the particular effect, when referred to the steam tables in a predetermined operating temperature range of the effect, such as shown in FIGURE 7. A minimum of 0.25″ Hg and a maximum of 1″ Hg being desirable as will be subsequently explained represented in the figure by zig-zag lined within the confines of the various sections are the bundles of tubes which furnish separate heat exchanger or condenser structures for the individual sections. As indicated by this showing, these structures are suitably arranged to span across groups of flash chambers constituted by the multiple stages of the several effects. A number of such heat exchangers 730 to 735, which are shown individually situated in the upper portion of the respective sections, are serially connected by a plurality of conduits 791 to 799 and 710 to 720 in which salt water, supplied from an input conduit 791, is fed to these heat exchangers so as to pass therethrough and eventually into primary heater 721. The connecting conduits actually carry the feed to the plant in the manner of the well known forward feed system. Only a small part of the salt water, usually one and a half times the product rate, arriving in conduit 791 is fed in conduit 793 since a major portion of this salt water functions only as a coolant for heat exchanger 736, and is released from the system in a conduit 714. Effect sections 723, 724, 725, 726 and 727 are also provided with second condenser structures 750 to 754, respectively, which function for a purpose to be hereinafter more fully explained. Approximately set up below the various heat exchangers and condensers in the individual sections, are tray-like structures 755 to 758 in which are collected the condensates produced from the flash evaporation. A further plurality of conduits 761 to 763 are provided to join trays 755 to 758 in a serial arrangement whereby the condensate in each section is added to the condensates of the preceding sections, and directed to pass through the effects and out of the system in a terminal conduit 764.

Each effect is also provided with additional conduits wherein heated brine from a brine heater flows to the flash chambers of the effect's stages, and cooled brine from the low temperature stage of the effect is diverted to pass through several heat sources before the brine is reintroduced to the effect for further flash evaporation. Consequently, the input of heated brine to first effect F1 is traceable through a conduit 743 in which brine from heater 721 is delivered to section 722 of the effect. The heat source for this brine is steam circulated through pipes in heater 721 by way of conduits 741 and 742. In other conduits 744 and 746 the main flow of brine passes from section 723, through a pump 745, and mixes with the feed brine arriving in conduit 747, before flowing into the bundle of tubes constituting heat exchanger 735 of section 722, wherefrom the mixture passes through conduit 720 to enter the system's primary heater 721. Excess brine from the low temperature, low pressure end of effect F1 is spilled over into conduit 748 which conducts the brine to a lower pressure flash evaporation stage in section 724 of second effect F2. Further conduits 771 and 773 are arranged in effect F2 to channel the main flow of brine from section 725 through pump 772 to the flash evaporator stages of section 724, and into condenser 753 in section 724. Brine passing through condenser 753 flows therefrom in a conduit 774 which supplies this brine to condenser 754 in section 723 of the first effect. Thus, cooled brine leaving the low temperature, low pressure end of the second effect, is heated in condensers 753 and 754 before it passes into a conduit 775 and is reintroduced to the flash evaporator stages of the second effect. Excess brine from the low temperature, low pressure end of second effect F2 is also spilled over into conduit 776 which conducts the now more concentrated brine of the second effect to a lower pressure stage in section 726 of third effect F3.

In a similar arrangement, brine processed in sections 726 and 727 of the third effect F3, is recycled through two condenser structures whereby it absorbs an appreciable amount of heat before it is again processed in the third effect. Brine first received in the third effect stages of section 726 is supplied from the spill-over through conduit 776. Brine is channelled within the flash evaporation stages of section 727 to a pump 780 via conduits 779 and 781 and from there to condenser 51 in section 726. After picking up heat in condenser 751, the brine flows through a conduit 782 and into condenser 752 in section 725 of the second effect where the brine receives additional heat before it passes into a conduit 783 for reintroduction to section 726 of the third effect. Since pump 780, as well as pumps 772 and 745 are each separately arranged for operation with respect to a different individual effect, adjustments thereto for progressively increasing the circulation rate in an effect are easily made in a conventional manner to obtain for the effect the maximum number of stages allowed by the pressure range and the degree of concentration desired for each effect.

The remaining brine spilling over from the third effect via conduit 784 is pumped to waste via pump 785 through conduit 786. The high concentrations in this brine make it particularly suitable for mineral recovery. It has been found that the sea water could be concentrated to any desired concentration as long as it was not operated between and five concentration sea water. It has also been found that when operating below 150° F. and at greater than five times normal sea water concentration the first salt to drop out of solution is some form of calcium sulphate, and appears as a milky suspension within the fluid and does not adhere to the heat transfer surfaces. Under these operation conditions and with the feed treated as outlined below, no scale forms on the heat transfer surfaces.

The primary feed treatment is the conventional pH control method requiring the addition of acid and the removal of carbon dioxide to hold pH relatively constant in the distillation process of the system. The feed is acidified in acid mixer 792 and in conduit 798 is admitted by level controller 794 to a spray nozzle in atmospheric spray tower 795 to reduce the $CO_2$ from the acid reaction down to about 20 p.p.m. from its initial content of about 80 p.p.m. From the tower 795 the feed is vacuum dragged in conduit 796 to auxiliary condenser 730 and via conduit 797 to heater 731 and thence via conduit 798 under control of a flow control device at a rate of about 1½ times the product rate to a spray nozzle in flashaerator F4 where the residual $CO_2$ and $O_2$ and other non-condensibles are stripped under vacuum by the flashing vapors generated by recirculating a major portion of the feed through conduit 710 via pump 711 via conduit 712 through condenser 750 and thence to conduit 713 where the flashed vapors scrub the flashing spray and effectively remove the non-condensible gases. A small portion of the feed is flashed off to form distillate from condensers 730 and 736. The major portion of degassified and $HCO_3$ free sea water is spilled over into conduit 715 from where pump 716 pumps it in the conventional forward feed system through exchangers 732, 733 and 734.

Ordinarily, the operation of any heat effect requires that a predetermined range of specified temperatures be maintained across the effect such that during continuing operation heat introduced thereto must be balanced by an equal heat transfer or loss from the effect. Aside from the usual operational losses in the effects, which are generally under ten percent, the heat supplied to brine flowing into the evaporation chambers of their stages is either recovered by the liquid passing through the tube bundles of the heat exchanger and condenser structures spanning the stages, or carried out of the effects in the brine discharged from those stages operating at their low temperature, low pressure ends. Accordingly, significant heat wastage or rejection from any effect is most likely to occur from the stages at its brine discharge end, whereas a substantially complete recovery of heat is possible from the other stages of the effect. By arranging an auxiliary condenser across the heat reject stages, as was heretofore explained, heat normally lost with the brine discharge is made available to heat brine received in the condenser from a lower temperature effect. The three reject sections 723, 725 and 727 shown in the drawing are equipped with the main condensers 750, 752, 754 whereby they function in heat re-cycle arrangement for the second and third heat effects F2 and F3 respectively. Consequently, condenser 754 in the first effect becomes a brine heater for the recirculating discharge from second effect reject section 725, which after flowing through conduit 773, heat recovery condenser 753 in the second effect heat recovery section 724, passes through this brine heater, conduit 774 and conduit 775, to re-enter and again be processed in the second effect. Similarly, condenser 752 in the second effect becomes a brine heater for the recirculating discharge from third effect reject section 727, flowing through conduit 781, heat recovery condenser 751 and conduits 782 and 783.

The flashaerator F4 is incorporated as an integral part of the distilling plant operating from the heat of rejection of F3 rather than using prime heat energy in the form of live steam for stripping. Conventional deaerators use up to 1,000 lbs. of steam per hour per million gallons of product water and this is non-productive heat energy which has to be charged to the net plant economy. Effective use of the large amount of low grade waste heat can strip the entrained air and residual $CO_2$ gases when raw sea water is acidified to prevent both calcium carbonate and magnesium hydroxide scale deposits.

Figure 8:
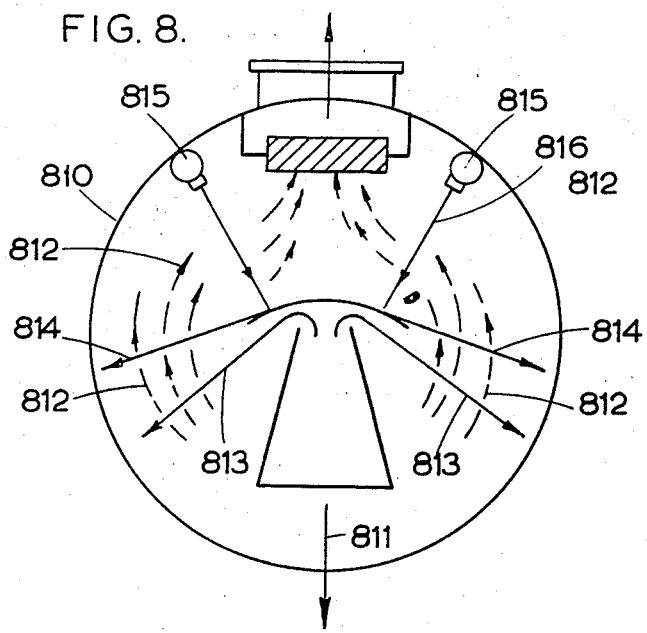
FIGURE 8 shows a sectional end elevation through a preferred flashaerator.

FIGURE 8 shows a flashaerator 810 which can countercurrent strip in two stages to reduce the $O_2$ content below a measurable level of less than ½ p.p.b. and $CO_2$ of less than 3 p.p.m. When integrated with the plant the feed absorbs a portion of heat rejection from F3 in condenser 731 and is introduced into the flashaerator in a sheet of flashing liquid-vapor mixture at deep vacuum. Also, combined in this unit is a recirculation stream 811 which absorbs most of the remaining heat of rejection from F3 and flashes in F4. The vapor 812 from this stream crosses through thin sheet 813 of feed to strip $CO_2$ and $O_2$ and then crosses the sheet 814 of incoming feed to further strip $CO_2$ and $O_2$. The feed enters the flashaerator 810 through feed spray pipes 815 at a temperature about saturation temperature within chamber by 3–4°. After this deaeration, the feed joins the recirculation stream to pick up the heat of rejection and reflash. This provides for increased residence time and allows the reaction $H_2CO_3 \rightarrow H_2O + CO_2$ to go to completion. Then, the feed for the plant is spilled over to pump 716 and used to feed the evaporator as previously described. The vapor released in F4 augments the capacity of the plant.

The essential difference between this arrangement and multiple flash evaporators used in the past is that the recirculation rate is determined by the pressure difference available in the last stage for transfer of the fluid from the preceding stage. Based on the last stage being at a temperature of 100° F., four degree temperature gradient per stage will provide 0.25″ Hg for fluid transfer. If we assign a value of 10 to the circulation rate of a Single Effect Multi-Stage (SEMS) plant operating over a temperature range from 250° down to 100°, the heat available for flash distillation Q=circulation rate × temperature drop or 10(250−100)=1500. With the SEMS plant the circulation rates can be progressively increased in proportion to the square root of the pressure gradient available in the last stage, thus:

$F1 = 10 \times (150-100)$ _____ 500
$F2 = 12.6 \times (220-150)$ _____ 882
$F3 = 20 \times (260^1 - 220)$ _____ 800
_____
2182

[1] See subsequent discussion regarding increasing top temperature with lower concentration.

therefore the progressively increasing circulation rates permits a thermal gain of 45% over the conventional plant.

Figure 9:
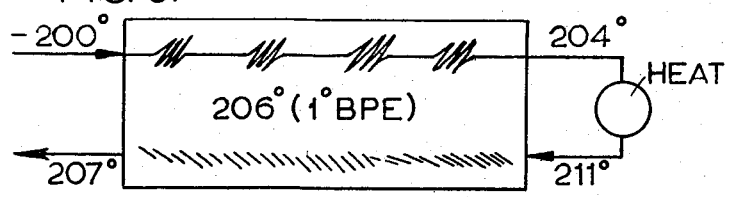
FIGURES 9 and 10 show examples relating to the description of the evaporator of FIGURE 7.
Figure 10:
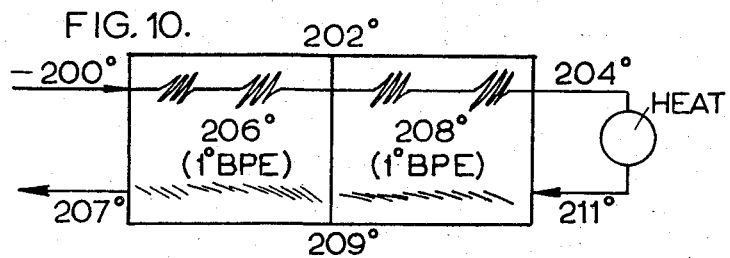

The thermal gain is spread over a much greater number of stages—approximately twice the number and, as illustrated by the examples shown in FIGURES 9 and 10, considerably less heat transfer surfaces will be required.

In FIGURE 9 to transfer 4 B.t.u. per pound of liquid flow the log mean temperature difference is 3.64° F.

In FIGURE 10 to transfer 4 B.t.u. per pound of liquid flow the log mean temperature difference is 5° F.

Overall gain=5/3.64=1.37

Note.—In a similar calculation, a 1° F. flashdown will show a gain of 50%.

In other words, for approximately the same heat transfer surfaces, SEMS will furnish approximately a 40% gain in product ratio to heat input.

As a result of dividing the overall system into distinct multiple effects, it becomes feasible to maintain a different concentration of impurities in the recirculation arrangement of each effect. Such flexibility in the control of concentration in turn allows the application of higher operating temperatures in the first or high pressure effect wherein a low concentration of impurities is maintained. With higher operating temperatures thus made practical, the higher gain ratios previously noted can be realised in the operation of the over-all system. In this connection the passage of the product water and brine flowing counter-current to the incoming feed promotes the useful recovery and distribution of the heat supplied to the system in the progressive heating of the forward feed system.

The capability in the invention to vary separately the concentration factor in each effect also gives rise to several additional advantages. As was heretofore indicated, it has been found that at the low temperature effect F3 can concentrate in excess of a factor of five by bypassing some of the brine in conduit 776 so that the milky precipitate will form which prevents scale on the heat transfer surfaces. The brine can then be used as a source of slurry for the seeding technique of scale prevention. The higher concentration also provides opportunity for the more economical recovery of minerals as a byproduct of the distillation process.

Although FIGURE 7 is particularly concerned with a three effect arrangement coupled to a deaerator, it is obvious that the teaching herein is applicable to distillation systems comprising many more effects. The number of stages in each effect and the distribution of such stages into heat recovery and heat reject sections, may also be varied as required for any particular application of the system. However, when all necessary operational conditions of temperature approaches for an effect are met, and the same amount of condensing surface is available in each of its stages, a measure of the economy ratio that may be obtained is derived by dividing the number of heat recovery stages by the number of heat reject stages. A total economy ratio for the system is learned by adding all the values derived for the effects individually. Thus in the case chosen for FIGURE 1 we have $F_1=5$, $F_2=8$, $F_3=5$, $F_3=1$ for a total of 19 pounds of distillate per 1,000 B.t.u. of heat energy added.

Figure 2:
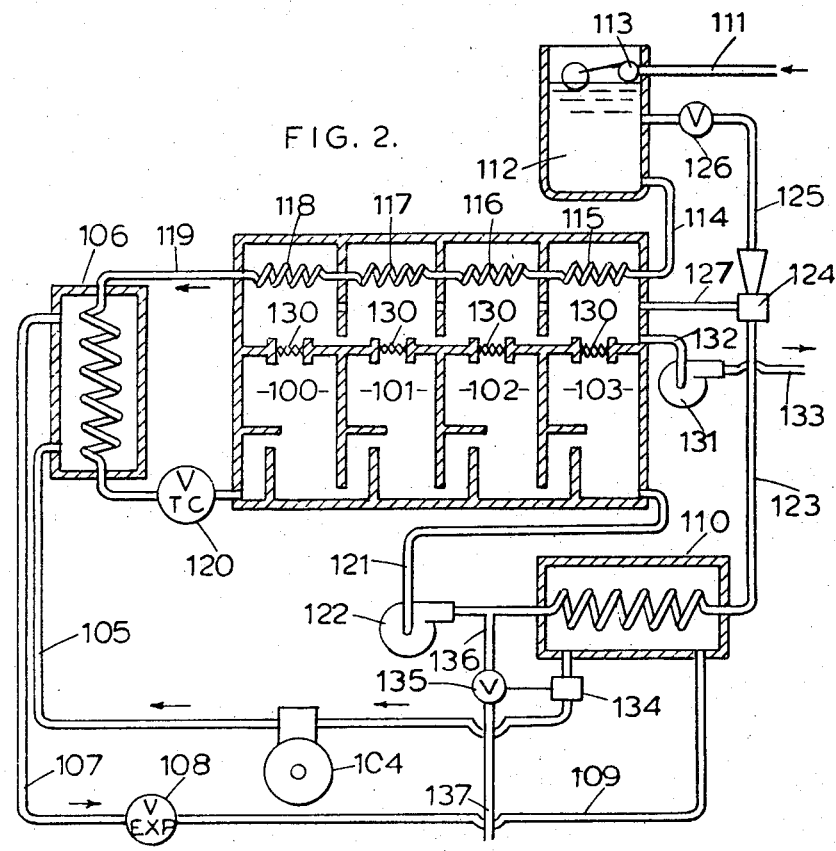

Referring now to FIGURE 2, a second embodiment of this invention has a number of stages 100–103. A freon compressor 104 pumps freon through pipe 105 to the freon condenser 106. From the freon condenser 106 pipe 107 returns the freon through the expansion valve 108 and pipe 109 to the freon evaporator 110.

Feed water passes into the open tank 112 through pipe 111. Tank 112 has its water level controlled by the float valve 113. Brine or other liquid to be distilled is vacuum drawn from tank 112 through pipe 114 through the condensing coils 115–118. From the condensing coils 118 the brine passes through pipe 119 to pick up heat within the freon condenser 106. Brine flows from the freon condenser 106 through the temperature control valve 120 which ensures that the temperature of water entering stage 100 is at least 140° F. The brine flashes to steam within the stages 100–103 and is withdrawn from stage 103 through pipe 121 by the eductor pump 122. Eductor pump 122 passes the brine through the freon evaporator 110 and through pipe 123 to the eductor 124. From eductor 124 pipe 125 leads through valve 126 to tank 112. Eductor 124 draws carbon dioxide and other gases through pipe 127 and discharges them into tank 112.

Steam passes through the wire mesh drop separators 130 to condense about the coils 115–118. Distillate pump 131 draws distillate from stage 103 through pipe 132 and discharges it to storage through pipe 133. A suction pressure control 134 controls valve 135 in pipe 136. Control 134 opens valve 135 to dump brine when additional feed water must be introduced into the system to draw heat from the freon loop and then be eventually discharged through the waste pipe 137.

The second embodiment of this invention is particularly effective when used to distill water from a deep well under pressure. During the cycle of the feed water, the free gases in solution, such as carbon dioxide, are liberated to the atmosphere in tank 112. Thus the carbon dioxide may escape from the feed water immediately upon entering the system so the feed water is distilled with a low carbon dioxide content. This mechanical feature of the second embodiment of this invention gets around the chemical problem of scale formation in that the $HCO_3^-$ present plus heat yields $CO_2$ plus $OH^-$. Free carbon dioxide plus water yields the soluble $H_2CO_3$ and bypasses the scaling problem.

Figure 3:
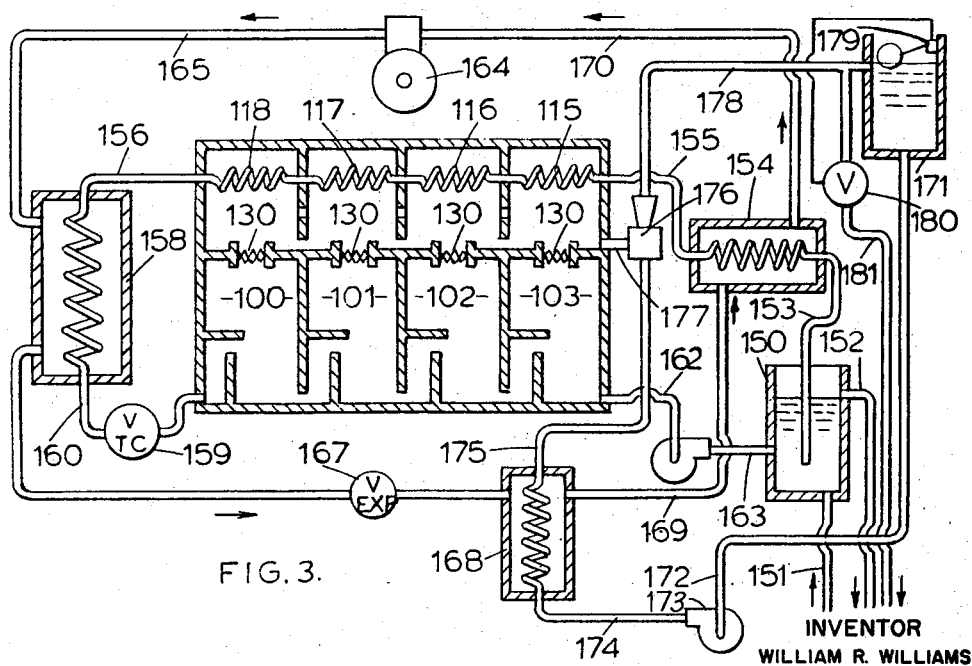

Referring now to FIGURE 3, the third embodiment of this invention may have a distillation unit having stages 100–103 which are substantially identical to those shown in FIGURE 2. The stages 100–103 contain the condensing coils 115–118. Feed water enters tank 150 through pipe 151 at about twice the rate required for evaporation. Excess water flows from tank 150 through the overflow pipe 152. Water is vacuum drawn from tank 150 through pipe 153 which leads through the freon evaporator 154. From evaporator 154 pipe 155 conducts water to pass through the condensing coils 115–118. Water passes through pipe 156 from the condensing coils to enter the freon condenser 158. A temperature control valve 159 in pipe 160 allows the fluid to pass into stage 100 and successively flash into vapor as it passes through the subsequent stages. The brine or fluid being distilled is then drawn from stage 103 by pump 161 through pipe 162. Pump 161 recirculates the brine by discharging it through pipe 163 into tank 150.

The freon loop is substantially similar to those which have been described. Compressor 164 pumps freon through pipe 165 to the freon condenser 158. From freon condenser 158 pipe 166 conducts the freon to the expansion valve 167 from which the freon passes through the distillate chiller 168. From distillate chiller 168 pipe 169 leads the freon to the freon evaporator 154. From evaporator 154, pipe 170 conducts the freon back to compressor 164.

An open distillate tank 171 has distillate drawn from it through pipe 172 by means of the distillate pump 173. Pump 173 discharges distillate through pipe 174 to pass through the distillate chiller 168 and emerge through pipe 175 which leads to the eductor 176. Eductor 176 draws condensate, carbon dioxide or other gases from stage 103 through pipe 177. From eductor 176 distillate and entrained gases flow through pipe 178 to the open distillate tank 171. A fluid level control 179 activates valve 180 in pipe 181 so that distillate drawn from the evaporator of this invention may be passed from the distillate eductor loop to storage through pipe 181.

The distillate tank 171 acts as an air-water separator and is first filled with a small quantity of fresh water to flood the distillate pump. The distillate pump 173 has a capacity to pump a considerably greater quantity of fresh water than can be made by the distillation apparatus. The motive force of this cooled water, which has passed through the distillate cooler 168, evacuates both air and distillate from the stages to the air-water separator or tank 171. It has been found by experience that even waters containing hydrogen sulphide will be effectively stripped of this obnoxious gaseous content when passed through this system. The use of a freon or sea water cooled distillate cooler 168 is very important to the operation of this embodiment of the invention as the motive heat of the distillate pump has to be continually removed from the system so that the temperature of the motive or distillate water is always below the suction temperature of the distiller and the non-condensibles removed therefrom. The colder the motive water or distillate water, the more efficient is the aeration and the degree of vacuum possible.

Since the incoming feed is fed through pipe 151 at ratios greater than the amount of distillate made, usually twice as much as the distillate made, this provides an excess amount of water in the enclosure 150 and this excess, now including some of the brine concentrate, spills over to waste. This provides a very simple arrangement to eject brine from the system with the use of the single pump 161. In addition, the excess feed water passing through the freon evaporator removes the heat generated in the freon loop by the freon compressor 164.

The three embodiments of this invention, when used as simple 1,000 gallons per day units, give rise to many advantages. Any refrigeration mechanic can service the freon loops. The entire unit operates very quietly and may be made completely automatic.

If desired, the apparatus of the third embodiment of this invention may be used as a concentrator for sea water, radioactive wastes, and the like. If feed water is not introduced into the system through pipe 151, fluid is concentrated in tank 150 as it recirculates. In the case of concentrating sea water, at between three and five concentrations, $CaSO_4$ precipitates in the system. When the concentration exceeds five, the $CaSO_4$ appears to precipitate in solution to form particles or nuclei on which further precipitation builds rather than on the heat transfer surfaces. This forms a milky solution which may easily be flushed from the system when extreme concentrations of sea water are desired.

While this invention has been shown and described in the best forms known, these are purely exemplary and modifications may be made without departing from the spirit and scope of the invention except as it may be more limited in the appended claims.

I claim:

1. In a multistage multieffect distillation system comprising a plurality of sets of stages comprising distinct heat effects having operative temperature gradients ranging progressively from a high to a low condition, condensing coils in each set of stages, and a plurality of pumps, the pump associated with each lower temperature set of stages pumping liquid emerging from the low temperature end of each set of stages through some of the condensing coils in this set of stages and through the endmost condensing coils in the succeeding set of stages, the pump associated with the highest temperature set of stages pumping liquid through the remaining condensing coils of the set of stages and through a heat exchanger, the novel improvement of providing pumps having different circulation rates.

2. In a multistage multieffect distillation system comprising a plurality of sets of stages comprising distinct heat effects having operative temperature gradients ranging progressively from a high to a low condition, condensing coils in each set of stages, and a plurality of pumps, the pump associated with each lower temperature set of stages pumping liquid emerging from the low temperature end of each set of stages through some of the condensing coils in this set of stages and through the endmost condensing coils in the succeeding set of stages, the pump associated with the highest temperature set of stages pumping liquid through the remaining condensing coils of the set of stages and through a heat exchanger, the novel improvement of providing pumps wherein the circulation rates are progressively increased at the higher temperature sets of stages.

3. Multistage multieffect distillation apparatus comprising a plurality of sets of stages comprising distinct heat effects having operative temperature gradients ranging progressively from a high to a low condition, condensing coils in each set of stages, and a plurality of pumps, said pumps being of differing circulation rates corresponding to the respective stage associated therewith, the pump associated with each lower temperature set of stages pumping liquid emerging from the low temperature end of each set of stages through some of the condensing coils in this set of stages and through the endmost condensing coils in the succeeding set of stages, the pump associated with the highest temperature set of stages pumping liquid through the remaining condensing coils of the set of stages and through a heat exchanger.

References Cited

UNITED STATES PATENTS

| | | | |
|---|---|---|---|
| 2,759,882 | 8/1956 | Worthen et al. | 202—174 |
| 3,119,752 | 1/1964 | Checkovich | 203—11 |
| 3,147,072 | 9/1964 | Thomsen | 203—11 X |
| 3,152,053 | 10/1964 | Lynam | 203—80 X |
| 3,249,517 | 5/1966 | Lockman | 202—173 X |
| 3,320,137 | 5/1967 | Jebens et al. | 203—173 |

NORMAN YUDKOFF, *Primary Examiner.*

F. E. DRUMMOND, *Assistant Examiner.*

U.S. Cl. X.R.

203—11, 88; 202—180